(12) United States Patent
Wilczewska et al.

(10) Patent No.: US 7,396,901 B2
(45) Date of Patent: Jul. 8, 2008

(54) METHOD FOR SYNTHESIS OF POLYMERS WITH THIOL FUNCTIONS

(75) Inventors: Zofia Agnieszka Wilczewska, Bialystok (PL); Mathias Destarac, Paris (FR); Hervé Adam, Princeton, NJ (US); Samir Zard, Gif-sur-Yvette (FR); Chakib Kalai, Paris (FR); Gérard Mignani, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 523 days.

(21) Appl. No.: 10/476,534

(22) PCT Filed: May 3, 2002

(86) PCT No.: PCT/FR02/01538

§ 371 (c)(1),
(2), (4) Date: Nov. 3, 2003

(87) PCT Pub. No.: WO02/090424

PCT Pub. Date: Nov. 14, 2002

(65) Prior Publication Data

US 2004/0132961 A1 Jul. 8, 2004

Related U.S. Application Data

(60) Provisional application No. 60/288,844, filed on May 4, 2001, provisional application No. 60/288,846, filed on May 4, 2001.

(30) Foreign Application Priority Data

Sep. 5, 2001 (FR) .................... 01 11494

(51) Int. Cl.
*C08G 75/26* (2006.01)
*C08F 4/44* (2006.01)

(52) U.S. Cl. .................... 528/390; 526/140; 526/317.1

(58) Field of Classification Search ................ 528/390; 526/140, 317.1
See application file for complete search history.

(56) References Cited

U.S. PATENT DOCUMENTS

| 3,449,301 A | 6/1969 | Noll et al. |
| 3,862,975 A | * 1/1975 | Csontos ...................... 558/245 |
| 3,914,214 A | * 10/1975 | Trimnell et al. ................ 536/56 |

FOREIGN PATENT DOCUMENTS

| FR | 2 794 463 A1 | 12/2000 |
| FR | 2 802 208 A1 | 6/2001 |
| GB | 1 223 655 | 3/1971 |
| GB | 1 508 699 | 4/1978 |
| WO | 98 58974 A1 | 12/1998 |
| WO | WO 00/75207 A1 * | 12/2000 |
| WO | 01/42312 A1 | 6/2001 |

* cited by examiner

*Primary Examiner*—Robert D. Harlan
(74) *Attorney, Agent, or Firm*—Buchanan, Ingersoll & Rooney, PC

(57) ABSTRACT

The invention concerns a method for preparing polymers having at least a thiol function, comprising pyrolysis of at least a polymer having at least a function of formula (I), wherein: R1, R2, R3 and R4 are such as defined in the description

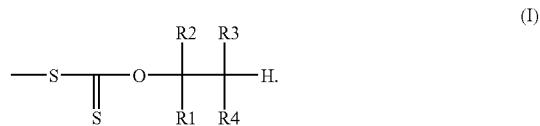

(I)

13 Claims, No Drawings

METHOD FOR SYNTHESIS OF POLYMERS WITH THIOL FUNCTIONS

This application claims priority under 35 U.S.C. § 119 to Provisional Application No. 60/288,844, filed in the United States on May 4, 2001 and to Provisional Application No. 60/288,846, filed in the United States on May 4, 2001, the entire contents of which are hereby incorporated by reference.

The present invention relates to a novel process for the preparation of polymers exhibiting thiol ends from controlled architecture polymers carrying specific xanthate functional groups, in particular resulting from a living or controlled radical polymerization process.

Polymers exhibiting thiol ends may have numerous fields of application. Thus, in cosmetics, they can be used in the hair field (such as in the field of permanent waves for the hair). They can also be used to generate organized layers of polymers on noble metal substrates, such as gold. In addition, in view of the reactivity of the thiol functional groups, the polymers thus obtained allow access to other polymeric compounds, in particular by nucleophilic substitution or by radical addition of these functional groups.

Controlled architecture polymers can be polymers (homopolymers) or copolymers (random, diblock, triblock, grafted or star, or hyperbranched copolymers). More specifically, within the meaning of the invention, the term "controlled architecture polymer" is understood to mean a polymer based on two or more monomers exhibiting a controlled arrangement of these various monomer units constituting it.

Controlled architecture polymers are usually prepared by living ionic polymerization. This type of polymerization exhibits the disadvantage of only making possible the polymerization of certain types of nonpolar monomers, in particular styrene and butadiene, and of requiring a particularly pure reaction medium and temperatures which are often below ambient temperature, so as to minimize side reactions, resulting in severe processing restrictions.

Radical polymerization exhibits the advantage of being easily carried out without excessive conditions of purity being observed and at temperatures equal to or greater than ambient temperature. However, until recently, there existed no radical polymerization process which makes it possible to obtain controlled architecture polymers, in particular block copolymers. Recently, a novel radical polymerization process has been developed: "controlled" or "living" radical polymerization (Matyjaszewski K., Ed., *Controlled Radical Polymerization*; ACS Symposium Series 685; American Chemical Society: Washington, D.C., 1998, and ACS Symposium Series 768, 2001). In these systems, reversible termination or transfer reactions make it possible to maintain the active ends throughout the polymerization, consequently giving access to various controlled architecture polymers.

Controlled radical polymerization ideally exhibits the following distinctive aspects:
1. the number of chains is fixed throughout the duration of the reaction,
2. the chains all grow at the same rate, which is reflected by:
   a linear increase in the molecular masses with the conversion,
   a narrow distribution of the masses,
3. the average molecular mass is controlled by the monomer/chain precursor molar ratio,
4. the possibility of preparing block copolymers.

The controlled nature is all the more marked as the rate of reactivation of the chains to radicals is very great considering the rate of growth of the chains (propagation). There exist cases where this is not always true (i.e. the rate of reactivation of the chains to radicals is less than the propagation rate) and the conditions 1 and 2 are not observed; nevertheless, it is still possible to prepare block copolymers.

Recently, living radical polymerization processes by reversible addition-fragmentation transfer have been developed. This specific type of polymerization constitutes one of the most appropriate technologies for synthesizing block copolymers by the radical route. In this context, xanthates RSC=SOR' have been used as transfer agents in patent applications WO 98/58974, WO 00/75207 and WO 01/042312 of Rhodia Chimie for synthesizing controlled architecture polymers. A preparation process by radical polymerization under thermal activation of silicone and organic hybrid copolymers has also been disclosed in French patent application FR 00 09722, filed by the applicant company on Jul. 25, 2000. These hybrid copolymers are prepared from a silicone precursor exhibiting reactive functional groups, in particular of the xanthate type, from at least one ethylenically unsaturated organic monomer and from a radical polymerization initiator. The disclosure has also been made, in French patent application No. 01 05144, filed by the applicant company on Apr. 13, 2001, of a process for the preparation of star-shaped polymers which comprises a stage of radical polymerization of a composition comprising: at least one crosslinking monomer, a source of free radicals and at least one first generation polymer. This first generation polymer is itself obtained by a process comprising a radical polymerization stage involving the reaction of at least one crosslinking monomer, a source of free radicals and at least one transfer agent, in particular xanthates of formula RSC=SOR', such as disclosed in patent applications WO 98/58974, WO 00/75207 and WO 01/042312.

However, despite the advantages introduced by these living radical polymerization processes, the polymers thus prepared exhibit reactive ends, such as, in particular, xanthate functional groups, which are unstable as they can be hydrolyzed in a basic medium. They are therefore liable to release sulfur-comprising byproducts of low molecular weight which are malodorous and/or toxic to the environment and to man.

In the following description, the term polymer is used to describe either homopolymers or copolymers, unless otherwise indicated.

Furthermore, the term "block polymer" is understood to mean a copolymer comprising at least two successive sequences of blocks of monomer units with different chemical compositions. The blocks can be composed of a homopolymer or of a polymer obtained from a mixture of ethylenically unsaturated monomers. In this case, the block can be a random copolymer. The block copolymer can comprise two blocks each composed of random copolymers. In this case, the ethylenically unsaturated monomers are such that the blocks obtained are of different natures. The term "different natures" is understood to mean blocks composed of monomers of different types but also blocks composed of monomers of the same type but in different amounts.

One aim of the present invention is to provide a simple but efficient processing method which makes it possible to remove the xanthate functional groups carried by polymers generally obtained by radical polymerization.

Another aim of the invention is to provide a novel access route to polymers with thiol functional groups.

These aims and others which will become apparent on reading the description are achieved by the present invention which relates to a process for the preparation of polymers exhibiting at least one thiol functional group, which comprises the pyrolysis of at least one polymer exhibiting at least one functional group of following formula (1):

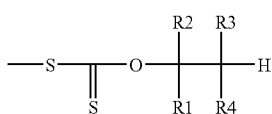

(1)

in which formula (1) R1, R2, R3 and R4, which are identical or different, represent a group selected from the hydrogen atom, alkyl, acyl, aryl, aralkyl, alkene or alkyne radicals, aromatic, saturated or unsaturated, cycloalkyl or a heterocycloalkyl radicals, or a polymer chain, it being possible for R1 and R4 or R1 and R2 together to form a cycloalkyl or a heterocycloalkyl.

The pyrolysis temperature employed in the process according to the invention depends to a large extent on the chemical nature of the R1, R2, R3 and R4 radicals. This pyrolysis temperature is selected such that the functional group of formula (1) exhibited by the polymers employed is converted to a thiol functional group and to produce carbonyl sulfide, of formula COS, and an olefinic compound of following formula (2): R1R2=R3R4. Thus, it is within the scope of a person skilled in the art to define the polymerization conditions so that the pyrolysis reaction does not take place during this polymerization. To give an order of magnitude, the pyrolysis temperature is generally between 20 and 200° C., preferably between 100 and 180° C., more particularly between 130 and 160° C.

The pyrolysis according to the invention is generally carried out at atmospheric pressure.

The pyrolysis according to the invention is generally carried out on a polymer which is in solution, in emulsion (in the latex form), solid or in the molten state.

Thus, when it is carried out on a polymer which is in solution, the solvent is preferably a solvent exhibiting a boiling point greater than or equal to the pyrolysis temperature. Mention may in particular be made of water or an organic solvent, such as, in particular, 1,2-dichlorobenzene.

The optionally substituted alkyl, acyl, aryl, aralkyl or alkyne groups generally exhibit 1 to 20 carbon atoms, preferably 1 to 12 and more preferably 1 to 9 carbon atoms. They can be linear or branched. They can also be substituted by oxygen atoms, in particular in the form of esters, sulfur atoms or nitrogen atoms.

Mention may in particular be made, among alkyl radicals, of the methyl, ethyl, propyl, butyl, pentyl, isopropyl, tert-butyl, pentyl, hexyl, octyl, decyl or dodecyl radical. Methyl or ethyl radicals are preferred.

The alkyne groups are radicals generally of 2 to 10 carbon atoms. They exhibit at least one acetylenic unsaturation, such as the acetylenyl radical.

The acyl group is a radical generally exhibiting from 1 to 20 carbon atoms with a carbonyl group.

Mention may in particular be made, among aryl radicals, of the phenyl radical, optionally substituted in particular by a nitro or hydroxyl functional group.

Mention may in particular be made, among aralkyl radicals, of the benzyl or phenethyl radical, optionally substituted in particular by a nitro or hydroxyl functional group.

The ($C_3$-$C_8$) cycloalkyl radical is a cyclic hydrocarbonaceous radical, such as, in particular, cyclopropyl, cyclopentyl or cyclohexyl. Preferably, when R1 and R4 or R1 and R2 form a cycloalkyl, the latter is cyclohexyl.

The heterocycloalkyl radical is a cycloalkyl radical as defined above comprising, in place of one or more carbon atoms of the ring, one or more heteroatoms selected from N, O and S.

Mention may therefore in particular be made, among heterocycloalkyl radicals, of the piperidyl, pyrazolidinyl, piperazinyl and morpholinyl radical.

When R1, R2, R3 or R4 is a polymer chain, this polymer chain can result from a radical or ionic polymerization or can result from a polycondensation.

R1, R2, R3 and R4 are preferably selected so that the removal of the olefinic compound of formula (2) produced, indicated above, in particular by evaporation or entrainment with steam, is rendered easier.

Preferably, R1, R2, R3 and R4 represent groups selected from: the hydrogen atom, the methyl radical, the ethyl radical and the cyclohexyl radical for R1 and R4 or R1 and R2.

The polymer exhibiting at least one functional group of formula (1) employed in the process of the present invention is preferably an organic polymer, a polymer of silicone type or a hybrid copolymer formed, on the one hand, of a polymer of silicone type and, on the other hand, of an organic polymer.

These polymers can be obtained by radical and/or ionic polymerization. As a matter of fact, even if it was originally a matter of removing reactive functional groups obtained during the process for the synthesis of polymers by the radical route, it turns out that the process according to the invention also applies to polymers, such as silicone polymers, exhibiting at least one functional group of formula (1).

According to a specific embodiment, in order to exhibit at least one end of formula (1), the polymers used in the present invention were obtained by a process, such as disclosed in either of the patent applications WO 98/58974 and WO 00/75207 of Rhodia Chimie, employing at least one xanthate compound of following formula (2):

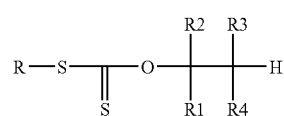

(2)

in which R, R1, R2, R3 and R4, which are identical or different, have the meanings given for R1, R2, R3 and R4 and specified above.

Thus, the polymers used in the process of the invention can, for example, be polymers resulting from a controlled radical polymerization process carried out by bringing into contact one or more ethylenically unsaturated monomer(s), at least one source of free radicals and at least one reversible transfer agent of xanthate type of formula (2). More specifically, the living organic polymers used in the process of the invention can be block polymers resulting from the copolymerization process comprising N successive stages of radical polymerizations (N being greater than or equal to 2), the first of these stages being a controlled radical polymerization carried out by bringing into contact one or more ethylenically unsaturated monomer(s), at least one source of free radicals and at least one reversible transfer agent of the abovementioned type and the following (N-1) stages being controlled radical polymerizations carried out by bringing into contact one or more ethylenically unsaturated monomer(s) other than those of the preceding stage, at least one source of free radicals and the living polymer composition resulting from the preceding stage.

For example, when N is equal to 2, the polymer used in the present invention can be a polymer of following formula (I):

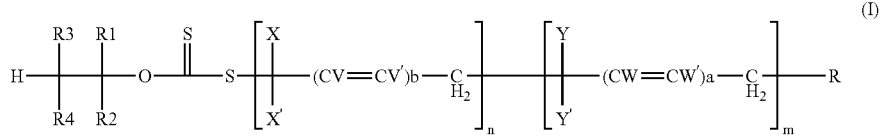

with
- m and n, which are identical or different, greater than or equal to 1, preferably greater than 6, and preferably less than 500, it being possible for one of the two (m or n) to be equal to 0; when m or n>1, the repeat units with the index m or n respectively are different or, advantageously, identical,
- R, R1, R2, R3 and R4, which are identical or different, have the meanings given above for R1, R2, R3 and R4,
- V, V', W and W', which are identical or different, represent H, an alkyl group or a halogen,
- X, X', Y and Y', which are identical or different, represent H, a halogen or an $R_5$, $OR_5$, $O_2COR_5$, NHCOH, OH, $NH_2$, $NHR_5$, $N(R_5)_2$, $(R_5)_2N^+O^-$, $NHCOR_5$, $CO_2H$, $CO_2R_5$, CN, $CONH_2$, $CONHR_5$ or $CON(R_5)_2$ group in which $R_5$ is selected from alkyl, aryl, aralkyl, alkylaryl, alkene or organosilyl groups which are optionally perfluorated and optionally substituted by one or more carboxyl, epoxy, hydroxyl, alkoxy, amino, halogen or sulfo groups, and
- a and b are 0 or 1.

The polymer exhibiting at least one functional group of formula (1) employed in the present invention can correspond to a star-shaped polymer. Thus, the latter can be obtained by a process as disclosed in French patent application No. 01 05144 filed by the applicant company on Apr. 13, 2001. This process comprises a stage of radical polymerization of a composition comprising: at least one crosslinking monomer, a source of free radicals and at least one first generation polymer. This first generation polymer is itself obtained by a process comprising a radical polymerization stage involving the reaction of at least one ethylenically unsaturated monomer, a source of free radicals and at least one xanthate compound of formula (2) as described above.

The crosslinking monomers are chosen from organic compounds comprising at least two ethylenic unsaturations and at most 10 unsaturations and known as being reactive by the radical route. Preferably, these monomers exhibit two ethylenic unsaturations.

Thus, mention may in particular be made of acrylic, methacrylic, acrylamido, methacrylamido, vinyl ester, vinyl ether, diene, styrene, α-methylstyrene and allyl derivatives. Preference is given, as crosslinking monomers, to N,N'-methylenebisacrylamide, divinyl-benzene and ethylene glycol diacrylate.

The polymer exhibiting at least one functional group of formula (1) employed in the present invention can correspond, according to another embodiment, to silicone and organic hybrid copolymers comprising units (II):

in which:
- x is equal to 0, 1, 2 or 3, y is equal to 0, 1, 2 or 3 with $2 \leq (x+y) \leq 3$ and y is other than 0 for at least one of the units of the hybrid copolymer, the symbols A, which are identical or different, represent:
- a linear or branched alkyl radical comprising 1 to 8 carbon atoms which is optionally substituted by at least one halogen, preferably fluorine, the alkyl radicals preferably being methyl, ethyl, propyl, octyl and 3,3,3-trifluoropropyl.
- an optionally substituted cycloalkyl radical comprising between 3 and 8 cyclic carbon atoms,
- an aryl radical comprising between 6 and 12 carbon atoms which can be substituted, preferably phenyl or dichlorophenyl,
- an aralkyl part having an alkyl part comprising between 5 and 14 carbon atoms and an aryl part comprising between 6 and 12 carbon atoms, optionally substituted on the aryl part by halogens, alkyls and/or alkoxyls comprising 1 to 3 carbon atoms, the symbols U, which are identical or different, represent (III):

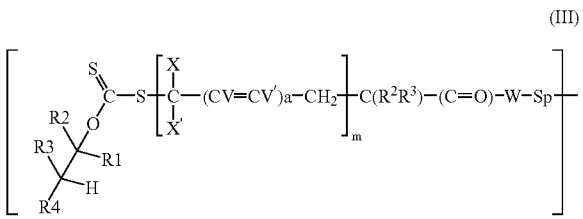

in which:
- R1, R2, R3 and R4, which are identical or different, have the meanings given above,
- V and V', which are identical or different, have the meanings given above,
- X and X', which are identical or different, have the meanings given above,
- $R^2$ and $R^3$, which are identical or different, represent:
  - an optionally substituted alkyl, acyl, aryl, alkene or alkyne group (i),
  - a carbonaceous ring (ii), which is saturated or unsaturated, optionally substituted and/or aromatic,
  - an optionally substituted, saturated or unsaturated, heterocycle (iii),
  - a hydrogen atom or groups: alkoxycarbonyl, aryloxycarbonyl (—$COOR^5$), carboxyl (—COOH), acyloxy (—$O_2CR^5$), carbamoyl (—$CONR^5_2$), cyano (—CN), alkylcarbonyl, alkylarylcarbonyl, arylcarbonyl, aralkylcarbonyl, phthalimido, maleimido, succinimido, amidino, guanidino, hydroxyl (—OH), amino (—$NR^5_2$), halogen, allyl, epoxy, alkoxy (—$OR^5$), S-alkyl, S-aryl, groups exhibiting a hydrophilic or ionic nature, such as alkaline salts of carboxylic acids, alkaline salts of sulfonic acids, poly(alkylene oxide) (POE, POP) chains, cationic substituents (quaternary ammonium salts), $R^5$, which are identical or different, representing an alkyl or aryl group, and/or a polymer chain, it being possible for the radicals (i), (ii) and (iii) advantageously to be substituted by: substituted phenyl groups, substituted aromatic groups or groups: alkoxycarbonyl, aryloxycarbonyl (—COOR$^5$), carboxyl (—COOH), acyloxy (—O$_2$CR$^5$), carbamoyl (—CONR$^5_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$^5_2$), halogen, allyl, epoxy, alkoxy (—OR$^5$), S-alkyl, S-aryl, groups exhibiting a hydrophilic or ionic nature, such as alkaline salts of carboxylic acids, alkaline salts of sulfonic acids, poly(alkylene oxide) (POE, POP) chains, cationic substituents (quaternary ammonium salts), $R^5$, which are identical or different, representing an alkyl or aryl group, and/or a polymer chain, W, which are identical or different, represent a divalent radical selected from —O—, —NR$_5$—, —NH— or —S—, R$_5$ having the meaning given above, Sp, which are identical or different, represent a linking unit composed of a divalent organic radical of formula —(CH$_2$)$_{x'}$- in which x' is between 1 and 20, it being possible for this radical to be substituted and/or to comprise at least one heteroatom, a=0 or 1, m≧1, and, when m>1, the repeat units with the index m are identical or different, m preferably being less than 500.

These hybrid copolymers can be obtained by the process in which the following are brought into contact:

at least one ethylenically unsaturated monomer of formula (IV):

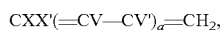

a precursor silicone compound comprising identical or different units of formula (V):

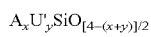

in which:

A, x and y correspond to the values given above, and the monovalent radical U' is according to the following formula (VI):

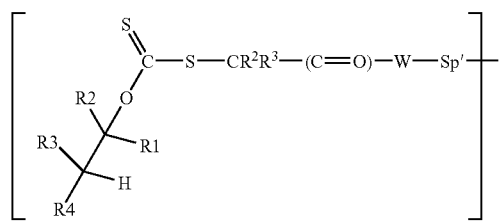

and a radical polymerization initiator.

The precursor silicone compound of general formula (V) used in the process for the preparation of these hybrid copolymers can be obtained by reaction:

(i) of a silicone comprising units of formula (VII):

where the monovalent radical U" is according to the following formula (VIII):

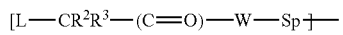

in which:

$R^2$, $R^3$, W and Sp have definitions identical to those given above,

L is an electrofuge group, for example: Br$^-$, Cl$^-$, I$^-$, OTs$^-$, OMs$^-$, (C$_6$H$_6$)-(C═O)—O$^-$, (CH$_3$)—(C═O)—O$^-$ or (CF$_3$)—(C═O)—O$^-$, (ii) with a compound selected from those of following general formulae (IX), (X) or (XI):

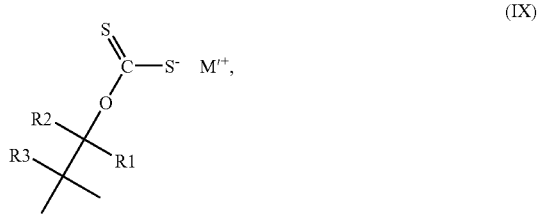

(IX)

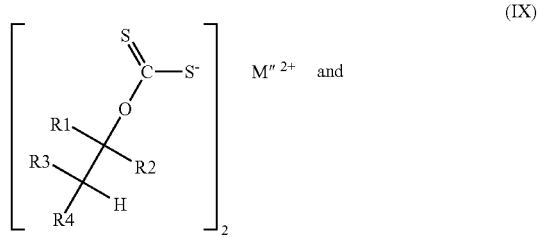

(IX)

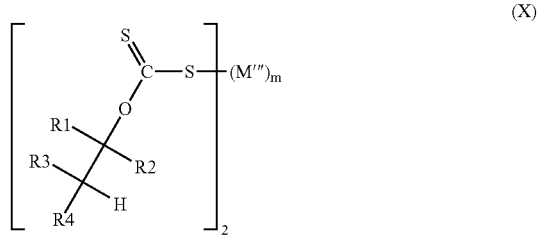

(X)

in which:

R1, R2, R3 and R4, which are identical or different, have the meanings given above, M'$^+$ represents K$^+$, Na$^+$, NR$_4^+$ or PR$_4^+$, R having a definition similar to that given for R of the formula (I), M"$^{2+}$ represents an alkaline earth metal, such as Ca$^{2+}$, Ba$^{2+}$ and Sr$^{++}$, M'" represents Zn or Cd, m is equal to 1 or 2, n is equal to 1, 2, 3 or 4 and preferably m is equal to 1 and n is equal to 2.

This silicone of formula (VII) can be obtained in particular from (i) a silicone comprising units of formula (XII): R$_x$U'"$_y$SiO$_{[4-(x+y)]/2}$, where the monovalent radical U'" is of formula (XIII): —Sp—WH, and (ii) a compound of formula:

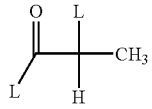

In addition to hybrid copolymers comprising a single organic segment, the polymers used in the process according to the invention can correspond to hybrid polymers carrying block organic groups (that is to say multiblocks). For this, their preparation process consists in repeating the implementation of the preparation process described above using:

ethylenically unsaturated monomers which are different from those of the preceding implementation, and in place of the precursor silicone compound (V), the hybrid copolymer comprising block units (II) resulting from the preceding implementation.

According to this process for the preparation of multiblock copolymers, when it is desired to obtain copolymers comprising homogeneous blocks and not blocks comprising a composition gradient, and if all the successive polymerizations are carried out in the same reactor, it is essential for all the monomers used during one stage to have been consumed before the polymerization of the following stage begins and therefore before the new monomers are introduced.

These hybrid copolymers have been disclosed in French patent application FR 00 09722 filed by the applicant company on Jul. 25, 2000.

As mentioned above, the polymer exhibiting at least one functional group of formula (1) can correspond, according to another embodiment, to a polymer of silicone type. In this case, the polymer of silicone type is of general formula (V), as described above.

The ethylenically unsaturated monomers mentioned previously are more specifically, according to the invention, monomers selected from styrene or its derivatives, butadiene, chloroprene, (meth)acrylic esters, vinyl esters, vinyl nitrites, vinyl esters and amides of unsaturated carboxylic acids.

The following examples illustrate the invention without, however, limiting the scope thereof.

EXAMPLES

Example 1

Synthesis of the Sodium Salt of O-(2-propyl)xanthic Acid

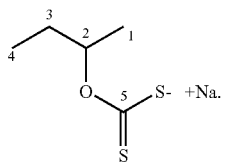

1 equivalent of 2-propanol is added dropwise at 0° C. to a solution (1M) of 1.1 equivalents of NaH in THF. 4 equivalents of $CS_2$ are added and the reaction medium is stirred at ambient temperature overnight.

The THF is subsequently evaporated and 1 liter of petroleum ether is subsequently added to wash the solid obtained, by filtration. The solid is subsequently dried under vacuum.

$^1$H NMR 5.45 ppm (sext., 1H(2)), 1.84 and 1.62 ppm (mult., 2×1H(3)), 1.32 ppm (doub., 2H(1)), 0.93 ppm (trip., 3H(4))

$^{13}$C NMR 208.0 ppm C(5), 81,5 ppm C(2), 28.8 ppm C(3), 19.0 ppm C(1), 10.0 ppm C(4).

Synthesis of a Silicone Oil (polydimethylsiloxane, DPn=14) α,ω-bis [O-(2-propyl)]xanthate

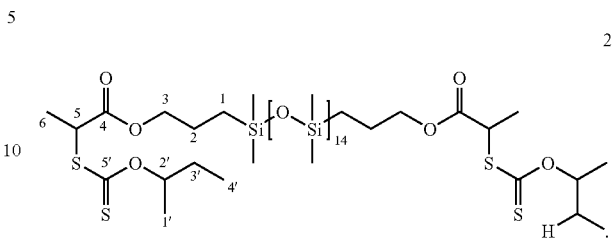

1.9 ml (2.4 equivalents) of 2-bromopropionyl bromide are added dropwise and at ambient temperature to a solution of 10 g of silicone oil α,ω-hydroxylated (polydimethylsiloxane, DPn=14) (1 equivalent) and 2.6 g (4 equivalents) of pyridine in ether (200 ml).

After stirring overnight at ambient temperature, 50 ml of water are added to the reaction mixture. The aqueous phase is subsequently extracted with 2×100 ml of ethyl acetate.

The combined organic phases are subsequently washed successively with an aqueous NaOH solution (1M), a 10% aqueous HCl solution, water and brine and then dried over magnesium sulfate. The solvents are subsequently evaporated. The crude product obtained is subsequently chromatographed on a silica column (heptane 9/ether 1) to give 11 g of brominated silicone oil.

1 g of brominated silicone oil is added to a solution of 0.5 g of xanthate 1 (4 eq.) in solution in 10 ml of $CH_3CN$. The reaction mixture is stirred overnight at ambient temperature. The solvent is evaporated, ether is subsequently added and then filtration is carried out to remove the excess xanthate salt and the sodium salt formed. In the spectrum of the crude product obtained, the bromine is completely displaced by the xanthate salt.

$^1$H NMR 5.56 ppm (sext., 2H(2')), 4.32 ppm (quar., 2H(5)), 4.06 ppm (trip., 4H(3)), 1.6 to 1.8 ppm (mult., 8H(2, 3')), 1.51 ppm (doub., 6H(6)), 1.30 ppm (mult., 6H(1')), 0.90 ppm (trip., 6H(4')), 0.52 ppm (mult., 4H(1)), 0.1 ppm (mult., SiMe$_3$)

$^{13}$C NMR 211.5 ppm C(5'), 171.4 ppm C(4), 82.7 ppm C(2'), 68.1 ppm C(3), 46.9 ppm C(5), 28.5 ppm C(3'), 22.6 ppm C(2), 18.7, 17.0 and 9.6 ppm C(1'), C(4') and C(6), 14.2 ppm C(1), 1.0 and 0.1 ppm (Si—CH$_3$).

Synthesis of the PDMS Oil (polydimethylsiloxane, DPn=14) α,ω-bisthiol

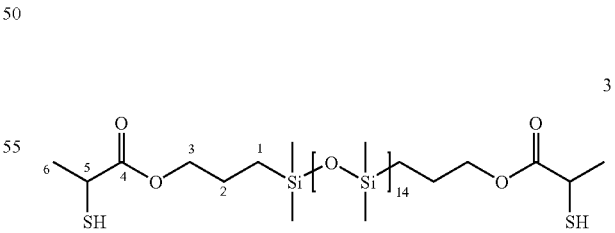

0.2 g of silicone carrying the xanthate functional group 2 is dissolved in 1 ml of chlorobenzene and then refluxed. After stirring for two hours, little change is observed.

In solution in dichlorobenzene, the 0.2 g of silicone 2 are refluxed for 2 hours.

The solvent is subsequently evaporated with the elimination products to give a crude product where the signals characteristic of the xanthate functional group are no longer observed by $^1$H and $^{13}$C NMR. On the other hand, $^1$H NMR still reveals 1 signal at 3.5 ppm which should correspond to H(5). The chemical shift of the corresponding carbon in the $^{13}$C spectrum confirms the same thing to us.

$^1$H NMR 4.09 ppm (split trip., 4H(3)), 3.50 ppm (mult., 2H(5)), 1.72 ppm (mult., 4H(2)), 1.50 ppm (doub., 6H(2)), 0.55 ppm (mult., 4H(1)), 0.1 ppm (mult., SiMe$_3$)

$^{13}$C NMR 68.0 ppm C(3), 48.2 ppm C(5), 22.7 ppm C(2), 17.0 ppm C(6), 14.1 ppm C(1), 1.1 and 0.2 ppm (Si—CH$_3$).

What is claimed is:

1. A process comprising:
pyrolyzing at least one polymer having a single functional group comprising:

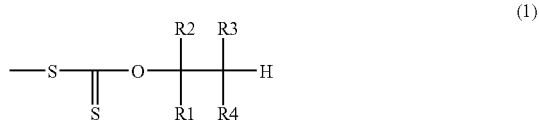

where R1, R2, R3 and R4 are identical or different and comprise: a hydrogen atom, alkyl, acyl, aryl, aralkyl, alkene or an alkene radical, an aromatic, saturated or unsaturated, a cycloalkyl radical, a heterocyclalkyl radical, or a polymer chain;

wherein the pyrolysis is carried out on the polymer having a single functional group in solution or in an emulsion; and wherein the pyrolyzing converts the functional group to a thiol functional group.

2. The process of claim 1, wherein the pyrolysis temperature is between 20 and 200° C.

3. The process of claim 2, wherein the pyrolysis temperature is between 100 and 180° C.

4. The process of claim 3, wherein the pyrolysis temperature is between 130 and 160° C.

5. The process of claim 1, wherein the solution comprises water or and an organic solvent.

6. The process of claim 5, wherein the solvent is 1,2-dichlorobenzene.

7. The process of claim 1, wherein R1, R2, R3 and R4 represent groups selected from the group consisting of the hydrogen atom, the methyl radical, the ethyl radical and the cyclohexyl radical for R1 and R4 or R1 and R2.

8. The process of claim 1, wherein the polymer exhibiting the single functional group of formula (1) is a polymer selected from:
an organic polymer;
a polymer of silicone type; and
a hybrid copolymer, formed from a silicone polymer and an organic polymer.

9. The process of claim 1, wherein the polymer exhibiting the single functional group of formula (1) is a polymer of following formula (I):

wherein:

m and n, identical or different, and are greater than or equal to 1, it being possible for one of m or n to be equal to 0; it being understood that, when m or n>1, the repeat units with the index m or n respectively are different or identical, R, R1, R2, R3 and R4, which are identical or different, represent a group selected from the hydrogen atom, alkyl, acyl, aryl, aralkyl, alkene or alkyne radicals, aromatic, saturated or unsaturated, cycloalkyl or heterocycloalkyl radicals, or a polymer chain, V, V', W and W', which are identical or different, represent H, an alkyl group or a halogen, X, X', Y and Y', which are identical or different, represent H, a halogen or an R$_5$, OR$_5$, O$_2$COR$_5$, NHCOH, OH, NH$_2$, NHR$_5$, N(R$_5$)$_2$, (R$_5$)$_2$N$^+$O$^-$, NHCOR$_5$, CO$_2$H, CO$_2$R$_5$, CN, CONH$_2$, CONHR$_5$ or CON(R$_5$)$_2$ group in which R$_5$ is selected from alkyl, aryl, aralkyl, alkylaryl, alkene or organosilyl groups which are optionally perfluorated and optionally substituted by one or more carboxyl, epoxy, hydroxyl, alkoxy, amino, halogen or sulfo groups, and a and b are 0 or 1.

10. The process of claim 1, wherein the polymer is a silicone and organic hybrid copolymer comprising units (II):

$$A_xU_ySiO_{[4-(x+y)]/2} \qquad (II)$$

wherein:

x is equal to 0, 1, 2 or 3, y is equal to 0, 1, 2 or 3 with 2 # (x+y) # 3 and y is other than 0 for at least one of the units of the hybrid copolymer, each of symbols A, which are identical or different, represent:

a linear or branched alkyl radical comprising 1 to 8 carbon atoms which is unsubstituted or substituted by at least one fluorine or other halogen, a substituted or unsubstituted cycloalkyl radical comprising between 3 and 8 cyclic carbon atoms, an aryl radical comprising between 6 and 12 carbon atoms, substituted or not substituted, an aralkyl part having an alkyl part comprising between 5 and 14 carbon atoms and an aryl part comprising between 6 and 12 carbon atoms, substituted or unsubstituted on the aryl part by halogens, alkyls and/or alkoxyls comprising 1 to 3 carbon atoms, each of symbols U, which are identical or different, represent (III):

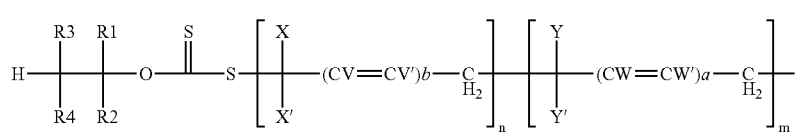

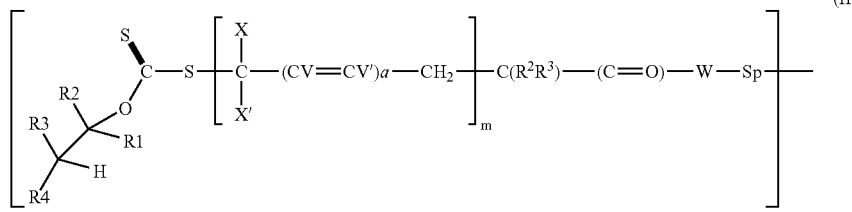

in which:
R² and R³, which are identical or different, represent:
- a substituted or unsubstituted alkyl, acyl, aryl, alkene or alkyne group (i),
- a carbonaceous ring (ii), which is saturated or unsaturated, substituted or unsubstituted, and/or aromatic,
- a substituted or unsubstituted, saturated or unsaturated, heterocycle (iii),
- a hydrogen atom or a group selected from the group consisting of: alkoxycarbonyl, aryloxycarbonyl (—COOR⁵), carboxyl (—COOH), acyloxy (—O₂CR⁵), carbamoyl (—CONR⁵₂), cyano (—CN), alkylcarbonyl, alkylarylcarbonyl, arylcarbonyl, arylalkyl-carbonyl, phthalimido, maleimido, succinimido, amidino, guanidino, hydroxyl (—OH), amino (—NR⁵₂), halogen, allyl, epoxy, alkoxy (—OR⁵), S-alkyl, S-aryl,
- alkaline salts of carboxylic acids, alkaline salts of sulfonic acids, poly(alkylene oxide) (POE, POP) chains, cationic substituents (quaternary ammonium salts), wherein the R⁵ groups, which are identical or different, represent an alkyl or aryl group, and/or a polymer chain, or other groups exhibiting a hydrophilic or ionic nature,
- it being possible for the radicals (i), (ii) and (iii) to be substituted by: substituted phenyl groups, substituted aromatic groups or groups: alkoxycarbonyl, aryloxycarbonyl (—COOR⁵), carboxyl (—COOH), acyloxy (—O₂CR⁵), carbamoyl (—CONR⁵₂), cyano (—CN), alkylcarbonyl, alkylarylcarbonyl, arylcarbonyl, arylalkyl-carbonyl, phthalimido, maleimido, succinimido, amidino, guanidino, hydroxyl (—OH), amino (—NR⁵₂), halogen, allyl, epoxy, alkoxy (—OR⁵), S-alkyl, S-aryl,
- or alkaline salts of carboxylic acids, alkaline salts of sulfonic acids, poly(alkylene oxide) (POE, POP) chains, cationic substituents (quaternary ammonium salts), R⁵, which are identical or different, representing an alkyl or aryl group, and/or a polymer chain, or other groups exhibiting a hydrophilic or ionic nature, W, which are identical or different, represent a divalent radical selected from —O—, —NR₅—, —NH— or —S—, Sp, which are identical or different, represent a linking unit composed of a divalent organic radical of formula —(CH₂)ₓ'— in which x' is between 1 and 20, it being possible for this radical to be substituted and/or to comprise at least one heteroatom, a=0 or 1, m=1, and, when m>1, the repeat units with the index m are identical or different.

11. The process of claim 10, wherein, in units II, all or parts of the symbols A represent a group selected from the group consisting of methyl, ethyl, propyl, octyl 3,3,3-trifluoropropyl, phenyl and dichlorophenyl.

12. The process of claim 7, wherein the polymer exhibiting the single functional group of formula (1) is a polymer of silicone type of formula (V):

$$A_xU'_ySiO_{[4-(x+y)]/2}$$

and the monovalent radical U' is according to the following formula (VI):

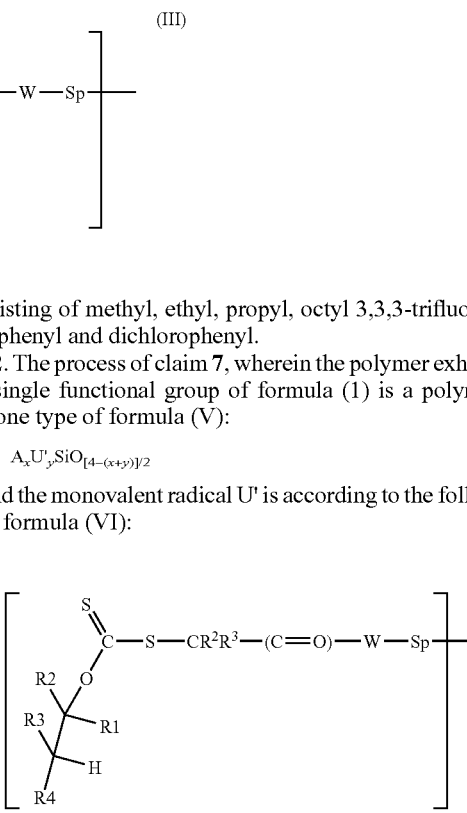

wherein:
x is equal to, 0, 1, 2 or 3, y is equal to, 0, 1, 2 or 3 with 2 # (x+y) # 3 and y is other than 0 for at least one of the units of the hybrid copolymer, each of symbols A, which are identical or different, represent:
- a linear or branched alkyl radical comprising 1 to 8 carbon atoms which is unsubstituted or substituted by at least one fluorine or other halogen,
- a substituted or unsubstituted cycloalkyl radical comprising between 3 and 8 cyclic carbon atoms,
- an aryl radical comprising between 6 and 12 carbon atoms, substituted or not substituted,
- an aralkyl part having an alkyl part comprising between 5 and 14 carbon atoms and an aryl part comprising between 6 and 12 carbon atoms, substituted or unsubstituted on the aryl part by halogens, alkyls and/or alkoxyls comprising 1 to 3 carbon atoms, W, which are identical or different, represent a divalent radical selected from —O—, —NR₅—, —NH— or —S—, Sp, which are identical or different, represent a linking unit composed of a divalent organic radical of formula —(CH₂)ₓ'— in which x' is between 1 and 20, it being possible for this radical to be substituted and/or to comprise at least one heteroatom.

13. The process of claim 1, wherein the polymer exhibiting at least one functional group of formula (1) is a star-shaped polymer.

* * * * *